(12) United States Patent  
Wells

(10) Patent No.: US 6,565,140 B2
(45) Date of Patent: May 20, 2003

(54) SUN VISOR WITH TINTED INSERT

(76) Inventor: David E. Wells, 415 Allenbrook Ct., Roswell, GA (US) 30075

(*) Notice: Subject to any disclaimer, the term of this patent is extended or adjusted under 35 U.S.C. 154(b) by 0 days.

(21) Appl. No.: 09/977,690

(22) Filed: Oct. 16, 2001

(65) Prior Publication Data

US 2003/0071478 A1 Apr. 17, 2003

(51) Int. Cl.⁷ .................................................. B60J 3/04
(52) U.S. Cl. ..................................... 296/97.2; 296/97.8
(58) Field of Search ............................ 296/97.2, 97.8; 359/229

(56) References Cited

U.S. PATENT DOCUMENTS

| | | | | |
|---|---|---|---|---|
| 2,238,981 A | * | 4/1941 | Newell | 296/97.8 |
| 2,856,810 A | * | 10/1958 | Frost | 296/97.2 X |
| 2,915,936 A | | 12/1959 | Winchell | |
| 2,915,937 A | | 12/1959 | Winchell | |
| 3,635,543 A | * | 1/1972 | Collins | |
| 4,384,740 A | | 5/1983 | Marrotta | |
| 4,858,989 A | | 8/1989 | Bruckstein | |
| 4,890,875 A | | 1/1990 | Takahashi | |
| 5,115,341 A | * | 5/1992 | Bentley | 359/493 |
| D334,551 S | | 4/1993 | Andres | |
| 5,283,683 A | * | 2/1994 | Yamamoto | 359/229 |
| 5,447,353 A | * | 9/1995 | Cheng et al. | 296/97.2 |
| 5,938,268 A | | 8/1999 | Wang et al. | |

FOREIGN PATENT DOCUMENTS

| | | | | |
|---|---|---|---|---|
| DE | 885360 | * | 8/1953 | 296/97.2 |
| DE | 1127238 | | 4/1962 | |
| DE | 3900876 | * | 10/1989 | 296/97.2 |
| DE | 3814390 | * | 11/1989 | 296/97.8 |
| IT | 0600616 | * | 12/1959 | 296/97.2 |
| JP | 0109723 | * | 4/1990 | 296/97.2 |

* cited by examiner

Primary Examiner—Dennis H. Pedder
(74) Attorney, Agent, or Firm—Richard C. Litman

(57) ABSTRACT

A sun visor having a tinted insert and a tinted extension. The visor may include slidable covers for covering the tinted insert and for making the visor appear like a regular sun visor. The visor of this construction allows for maximum visibility and protection from the sun for users of various heights.

4 Claims, 5 Drawing Sheets

SUN VISOR WITH TINTED INSERT

BACKGROUND OF THE INVENTION

1. Field of the Invention

The present invention relates to a sun visor having a tinted insert and extension.

2. Description of Related Art

Automobile visors having tinted windows for reducing sun glare are shown in U.S. Pat. No. Des. 334,551, issued on Apr. 6, 1993 to Noel Andres, U.S. Pat. No. 4,384,740, issued on May 24, 1983 to Paul Marrotta, and U.S. Pat. No. 4,890,875, issued on Jan. 2, 1990 to Tanewyuki Takahashi, and German Patent No. 1,127,238, published on Apr. 5, 1962.

Sun visors having windows, whose degree of tint can be adjusted are taught in U.S. Pat. Nos. 2,915,936 and 2,915,937, both issued on Dec. 8, 1959 to Wesley Winchell, and U.S. Pat. No. 5,938,268, issued on Aug. 17, 1999 to Chia-Hung Wang et al. U.S. Pat. No. 4,858,989, issued on Aug. 22, 1989 to Henry Bruckstein, teaches a cover for a tinted window of a sun visor.

None of the above inventions and patents, taken either singly or in combination, is seen to describe the instant invention as claimed.

SUMMARY OF THE INVENTION

The instant invention is a sun visor having a tinted insert and a tinted extension. The visor may include a slidable cover on either side of the visor for covering the tinted insert and for making the visor appear like a regular sun visor. The visor of this construction allows for maximum visibility and protection from the sun for users of various heights.

When a user flips a visor from an automobile ceiling to block the sun, the visor may become an impediment to the user seeing through the front windshield. However, a visor with a tinted insert allows the user to see through the visor, while the glare from the sun is reduced. Further, the extension provides a greater degree of sun protection when extended (particularly for shorter drivers).

Accordingly, it is a principal object of the invention to provide an automobile sun visor which protects from sun glare and has a portion through which one can see.

It is another object of the invention to provide a sun visor which has a tinted extension.

It is a further object of the invention to provide a cover for covering the tinted areas so that the sun visor has the appearance of a regular sun visor.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
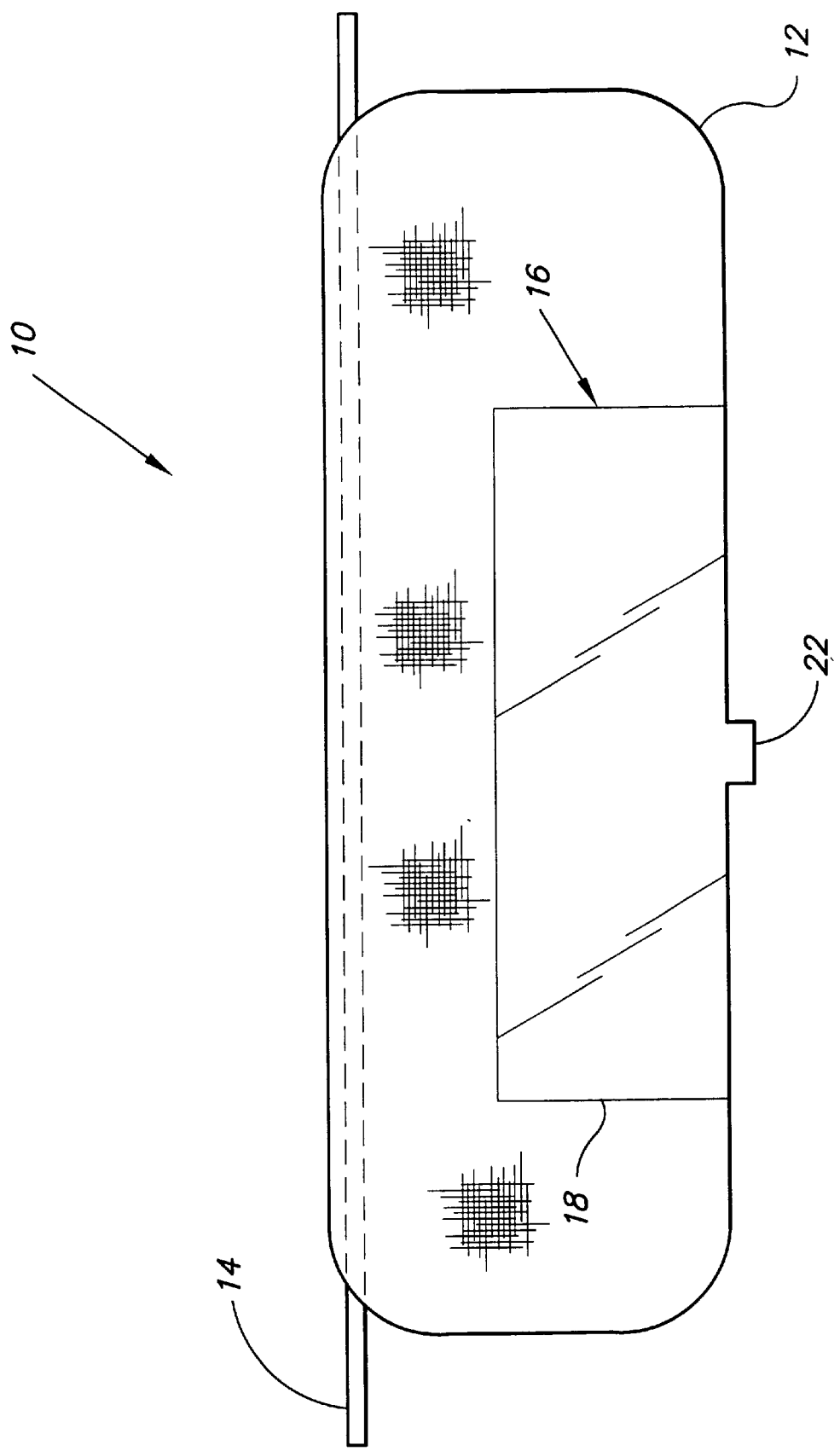
FIG. 1 is an environmental front view of a sun visor having a tinted insert and with its tinted extension retracted.

The present invention relates to an automobile sun visor having a tinted insert and a tinted extension. FIG. 1 shows a visor assembly 10 which includes a visor 12 rotatably mounted on an axle 14. The visor 12, which is preferably made of fabric such as cloth material, has a tinted area 16. This tinted area 16 allows a user to pull down the visor 12 to reduce the blinding impact of the sun while being able to see through a portion of the visor 12, which may be at eye level.

The tinted area 16 includes a fixed tinted insert 18 and a tinted extension 20 (seen in FIGS. 2 and 3) having a pull tab 22. The extension 20 is behind the tinted insert 18 and is not seen in FIG. 1 because it is in its withdrawn position. It is noted that the extension 20 is shown and described as behind the insert 18 for purposes of explanation. However, the orientation is immaterial and the invention will work as well and provide the same protection if the insert 18 is behind the extension 20. Both the insert 18 and the extension 20 are light sensitive, i.e. they are made of light-sensitive material or include photosensors.

Figure 2:
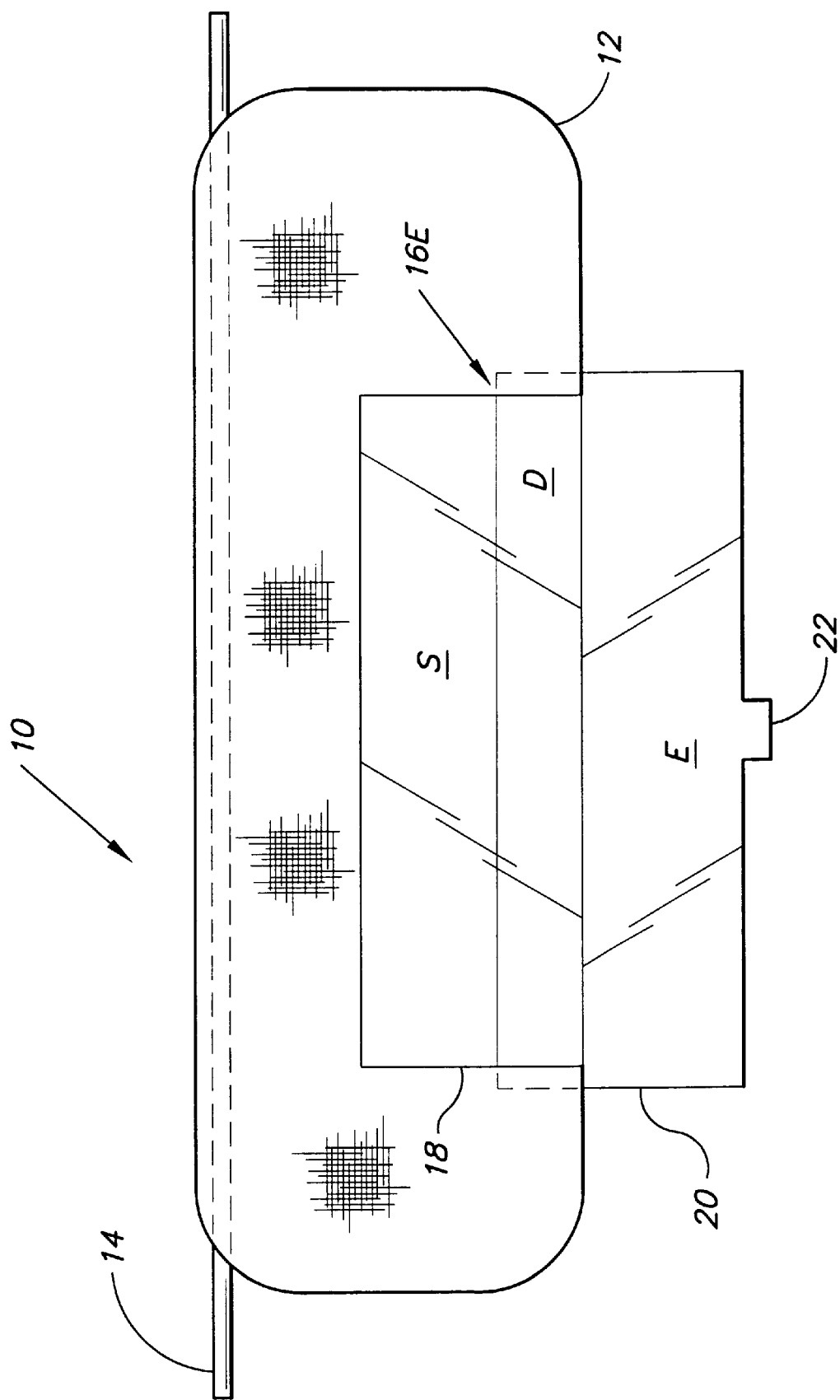
FIG. 2 is an environmental front view of a sun visor having a tinted insert and with its tinted extension extended.

FIG. 2 shows the extension 20 in an extended position, which provides more sun protection (particularly for a shorter driver) with extension section E of the newly defined extended tinted area 16E. The extension 20 is shown as wider than the insert 18 (however, it is noted that it can be the same width). This greater width results in a wider area of protection provided by the extension 20. It is noted that the lowering of the extension 20 results in the decrease in the layers of tint in the upper portion of the extended tinted area 16E (this area where there is a single layer is designated S). The lower portion of the extended tinted area 16E maintains its double thickness of tint, according to FIG. 2. However, it is noted that further extension may eliminate the section D.

Figure 3:
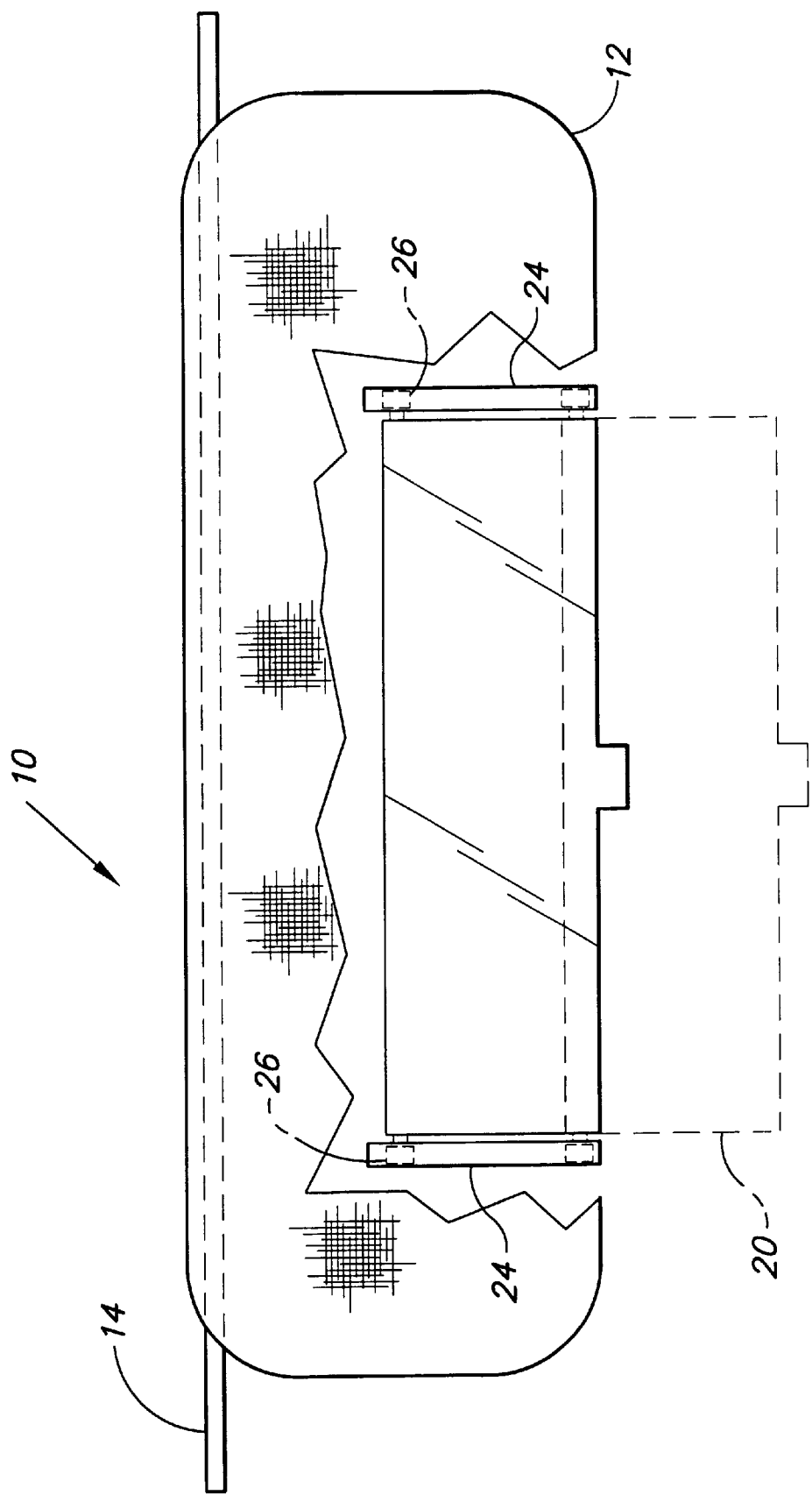
FIG. 3 is an environmental front broken-away view showing the movement of the extension using magnetic guides.
Figure 3A:
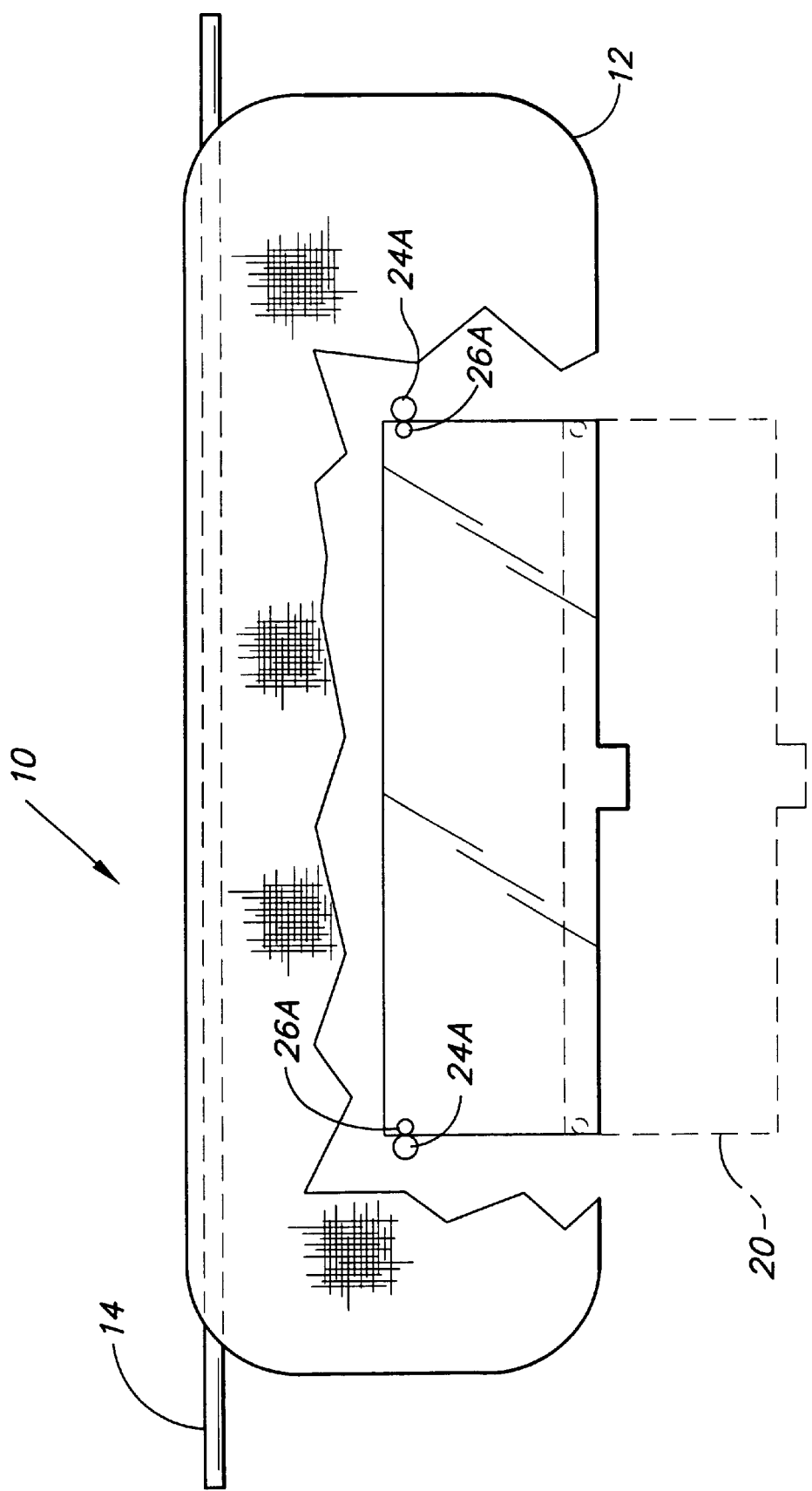
FIG. 3A is an environmental front broken-away view showing the movement of the extension using spot magnets.

Movement and support of the extension 20 is shown in FIGS. 3 and 3A, which do not show the insert 18. Movement, according to the embodiment of FIG. 3, is accomplished by magnetic guides or slots 24 and magnets 26, which slide in the slots 24, attached to the upper corners of the extension 20. According to the embodiment of FIG. 3A, movement is by means of magnets 24A attached to the visor 10 or the upper corners of the insert 18 and mating magnets 26A attached to the upper corners of the extension 20. Alternatively, patches of hook and loop fasteners may be used or any other means for facilitating the movement and supporting of the extension 20.

It is noted the extension in these figures is lowered all the way to increase the extent of protection. In the event it is not desired to completely lower the extension 20, it is adjusted to its desired height and the magnets 26 hold the extension 20 in place.

Figure 4:
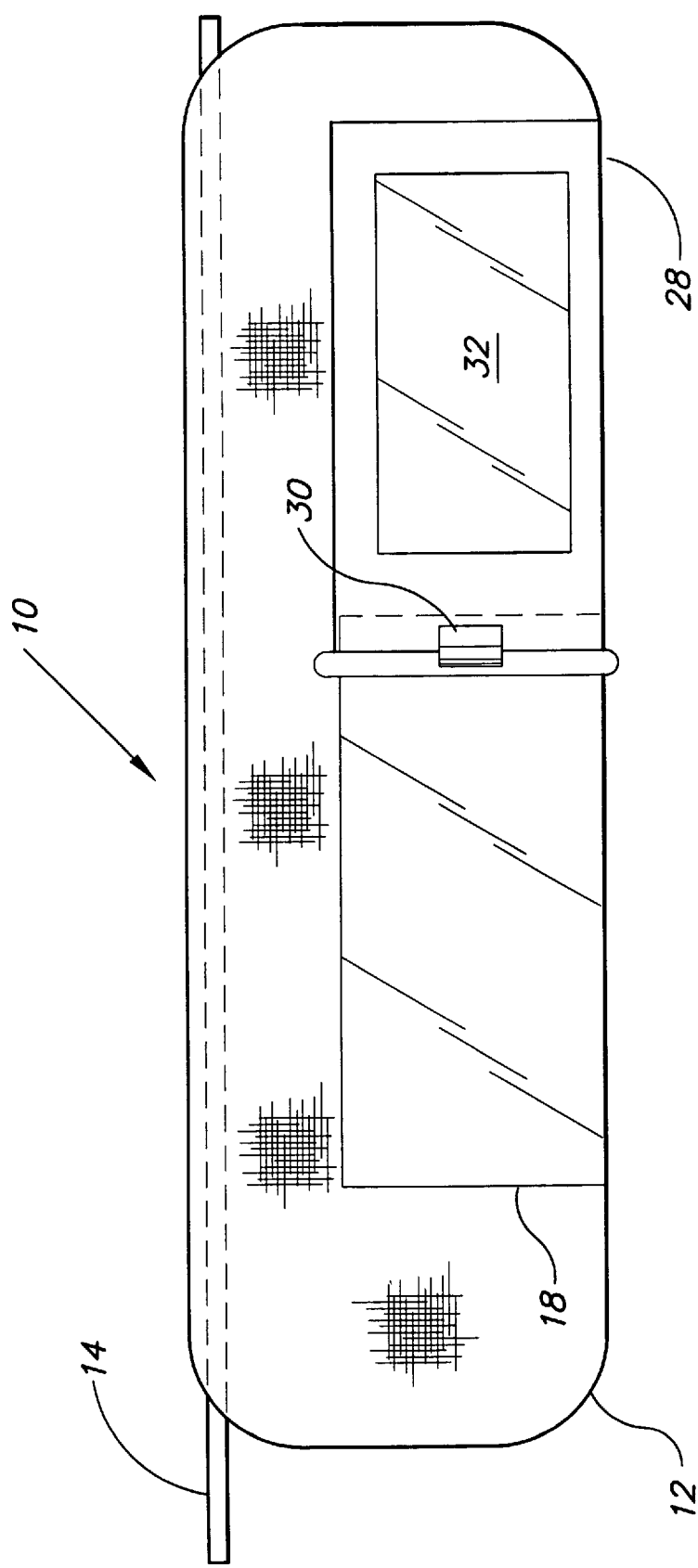
FIG. 4 is an environmental front view showing a cover for covering the insert.

FIG. 4 shows a cover 28 which can slide over the insert 18 to hide it from view when it is not being used. The depiction in FIG. 4 shows that the cover 28 slides to the right and does not slide past the boundary of the visor. However, the instant invention contemplates that the cover 28 can be configured to slide to the left or to extend past the boundary of the visor. The cover 28 includes a thumb grip 30, which acts as a stop in that its engagement with the fabric of the visor prevents the cover 28 from being opened too far. The cover 28, which may include a mirror 32, covers the insert 18 and an identical cover on the reverse of the visor covers the extension and the reverse side of the insert 18.

It is to be understood that the present invention is not limited to the sole embodiments described above, but encompasses any and all embodiments within the scope of the following claims.

I claim:

1. A sun visor with tinted insert for an automobile, comprising:
   a visor made of fabric adapted for attachment to the automobile, the visor being substantially rectangular and having an opening defined therein;
   a tinted insert fixed in the opening defined in the visor;
   a retractable tinted extension slidable between a retracted position in which the tinted extension overlaps the tinted insert, and an extended position in which the tinted extension extends below the tinted insert; and
   a cover slidable on said visor, the cover being slidable between a first position overlapping the opening in order to prevent light from passing through said tinted insert, and a second position in which said tinted insert is uncovered.
   whereby a user of the visor has an increased tinted viewing area for protection from sun glare when the tinted extension is in the extended position.

2. The sun visor according to claim 1, wherein:
   said visor has a pair of elongated slots made from a ferromagnetic material disposed on opposite sides of the opening; and
   said tinted extension has a pair of magnets disposed on opposite sides of said extension, said magnets being slidably disposed in the said slots;
   whereby said tinted extension is moved between the retracted and extended position by sliding said magnets in said slots.

3. The sun visor according to claim 1, wherein:
   said visor has a pair of visor magnets disposed on opposite sides of the opening; and
   said tinted extension has a pair of extension magnets disposed on opposite sides of said extension, the extension magnets having a polarity opposite to said visor magnets;
   whereby said tinted extension is moved between the retracted and extended position by sliding said extension magnets along said visor magnets.

4. The sun visor according to claim 1, further comprising a vanity mirror attached to said cover.

* * * * *